US006944476B1

(12) United States Patent
Altschul et al.

(10) Patent No.: US 6,944,476 B1
(45) Date of Patent: Sep. 13, 2005

(54) WIRELESS TELEPHONIC COMMUNICATION SYSTEM AND METHOD

(75) Inventors: Randice-Lisa Altschul, Cliffside Park, NJ (US); Lee S. Volpe, Mount Laurel, NJ (US)

(73) Assignee: Dieceland Technologies Corp., Cliffside Park, NJ (US)

( * ) Notice: Subject to any disclaimer, the term of this patent is extended or adjusted under 35 U.S.C. 154(b) by 341 days.

(21) Appl. No.: 09/888,180

(22) Filed: Jun. 22, 2001

Related U.S. Application Data

(63) Continuation-in-part of application No. 09/741,719, filed on Dec. 20, 2000, which is a continuation-in-part of application No. 09/660,130, filed on Sep. 12, 2000.

(51) Int. Cl.[7] .......................... H04Q 7/26; H04B 1/38; H04M 1/00
(52) U.S. Cl. ................. 455/557; 455/426.1; 455/465; 455/551; 455/554.1
(58) Field of Search .......................... 455/422.1, 426.1, 455/465, 550, 551, 554.1, 554.2, 555, 575.1, 90.1, 557, 556.1, 550.1

(56) References Cited

U.S. PATENT DOCUMENTS

| | | | |
|---|---|---|---|
| 5,797,101 A | * | 8/1998 | Osmani et al. ............. 455/551 |
| 5,815,807 A | | 9/1998 | Osmani et al. |
| 5,895,436 A | * | 4/1999 | Savoie et al. ............... 701/214 |
| 6,167,252 A | * | 12/2000 | Cohen ......................... 455/410 |
| 6,223,039 B1 | * | 4/2001 | Holm et al. ................ 455/435 |

* cited by examiner

Primary Examiner—Nay Maung
Assistant Examiner—Edan Orgad
(74) Attorney, Agent, or Firm—Arthur Jacob

(57) ABSTRACT

A wireless telephonic communication system and method facilitates the establishment of telephonic communication with any one of a multiplicity of wireless telephonic devices by enabling access to an existing telephonic communication infrastructure by any one of the multiplicity of wireless telephonic devices for the conduct of telephonic communication over the existing telephonic communication infrastructure without requiring a corresponding multiplicity of telephone access numbers. Each one of the wireless telephonic devices is provided with an assigned telephone access number common to all of the multiplicity of wireless telephonic devices, and an individual identification number unique to the one wireless telephonic device, and a telephonic communication between the one wireless telephonic device and a remote telephonic device is established upon a determination made in response to the individual identification number that the one wireless telephonic device is eligible for the conduct of the telephonic communication.

11 Claims, 11 Drawing Sheets

WIRELESS TELEPHONIC COMMUNICATION SYSTEM AND METHOD

This is a continuation-in-part of application Ser. No. 09/741,719, filed Dec. 20, 2000, which is a continuation-in-part of application Ser. No. 09/660,130, filed Sep. 12, 2000.

The present invention relates generally to wireless telephonic communication and pertains, more specifically, to a wireless telephonic communication system and method for facilitating the establishment of telephonic communication through any one of a multiplicity of wireless telephonic devices by enabling access to an existing telephonic communication infrastructure by any one of the wireless telephonic devices without requiring a corresponding multiplicity of telephone access numbers.

The proliferation of wireless telephones has created a need for greater airtime capacity and increased ease of access to that capacity. Traditionally, each new wireless telephone placed into service is activated by establishing an individual account and is assigned an individual access number, i.e., a telephone number, which identifies the account and the account owner. In addition, regulatory measures currently in effect require that each wireless telephone be identified with an electronic serial number (ESN) which is transmitted by the wireless telephone upon each use of the telephone.

With the introduction of relatively inexpensive, essentially disposable wireless telephones, it is anticipated that the sheer volume of wireless telephonic devices entering the field will increase the demand for airtime and access numbers to the point where the current system of individual assigned access numbers and electronic serial numbers will no longer be capable of meeting the demand for effective wireless communication. Since changes to the current telephonic communication infrastructure will require more time to accomplish than is available to keep up with the demand, there is a need for an immediate remedy in order to facilitate the use of the newly-introduced large volume of wireless telephonic devices.

The present invention provides a wireless telephonic communication system and method by which access to an existing telephonic communication infrastructure through any one of a multiplicity of wireless telephonic devices is facilitated for telephonic communication, without the need for a corresponding multiplicity of telephonic access numbers or electronic serial numbers. As such, the present invention attains several objects and advantages, some of which are summarized as follows: Allows current telephonic communication infrastructures to accommodate telephonic communication through ever-increasing numbers of wireless telephonic devices without the necessity for assigning an individual telephone number or an individual electronic serial number to each wireless telephonic device; facilitates telephonic communication through a very large number of wireless telephonic devices, utilizing currently available telephonic communication infrastructures in order to accommodate the proliferation of wireless telephonic communication devices; enables the use of current telephonic communication infrastructures to handle the burgeoning requirements for telephonic communication through wireless telephonic devices; opens new opportunities for promoting brand name recognition through the use of wireless telephonic devices; enhances the management of wireless telephonic communication for more effective use of currently available airtime and facilities; simplifies the acquisition and use of wireless telephonic devices for encouraging more widespread wireless communication and providing the benefits of such communication to an expanding community.

The above objects and advantages, as well as further objects and advantages, are attained by the present invention which may be described briefly as a wireless telephonic communication system for facilitating the establishment of telephonic communication with any one of a multiplicity of wireless telephonic devices by enabling access to an existing telephonic communication infrastructure by any one of the multiplicity of wireless telephonic devices for the conduct of telephonic communication over the existing telephonic communication infrastructure without requiring a corresponding multiplicity of telephone access numbers, the system comprising: a multiplicity of wireless telephonic devices, each one of the wireless telephonic devices having an assigned telephone access number common to all of the multiplicity of wireless telephonic devices, and an individual identification number unique to the one wireless telephonic device; and a telephonic communication center selectively accessed by any one of the multiplicity of wireless telephonic devices in response to the assigned common telephone access number for receiving a request for a telephonic communication from the one wireless telephonic device to a selected telephonic destination; the telephonic communication center including a processor for processing the request to determine the eligibility of the one wireless telephonic device for conduct of the requested telephonic communication, in accordance with to the individual identification number, and, upon determining that the one wireless telephonic device is eligible for conduct of the requested telephonic communication, establishing a connection to the existing telephonic communication infrastructure for completing a telephonic communication between the one wireless telephonic device and the selected telephonic destination.

In addition, the present invention includes a wireless telephonic communication method for facilitating the establishment of telephonic communication with any one of a multiplicity of wireless telephonic devices by enabling access to an existing telephonic communication infrastructure by any one of the multiplicity of wireless telephonic devices for the conduct of telephonic communication over the existing telephonic communication infrastructure without requiring a corresponding multiplicity of telephone access numbers, the method comprising: providing each one of a multiplicity of wireless telephonic devices with an assigned telephone access number common to all of the multiplicity of wireless telephonic devices, and an individual identification number unique to each one wireless telephonic device; and selectively accessing a telephonic communication center from any one of the multiplicity of wireless telephonic devices in response to the assigned common telephone access number for initiating a request for a telephonic communication from the one wireless telephonic device to a selected telephonic destination; processing the request to determine the eligibility of the one wireless telephonic device for conduct of the requested telephonic communication, in accordance with to the individual identification number and, upon determining that the one wireless telephonic device is eligible for conduct of the requested telephonic communication, establishing a connection to the existing telephonic communication infrastructure for completing a telephonic communication between the one wireless telephonic device and the selected telephonic destination.

The invention will be understood more fully, while still further objects and advantages will become apparent, in the following detailed description of preferred embodiments of the invention illustrated in the accompanying drawing, in which.

Figure 1:
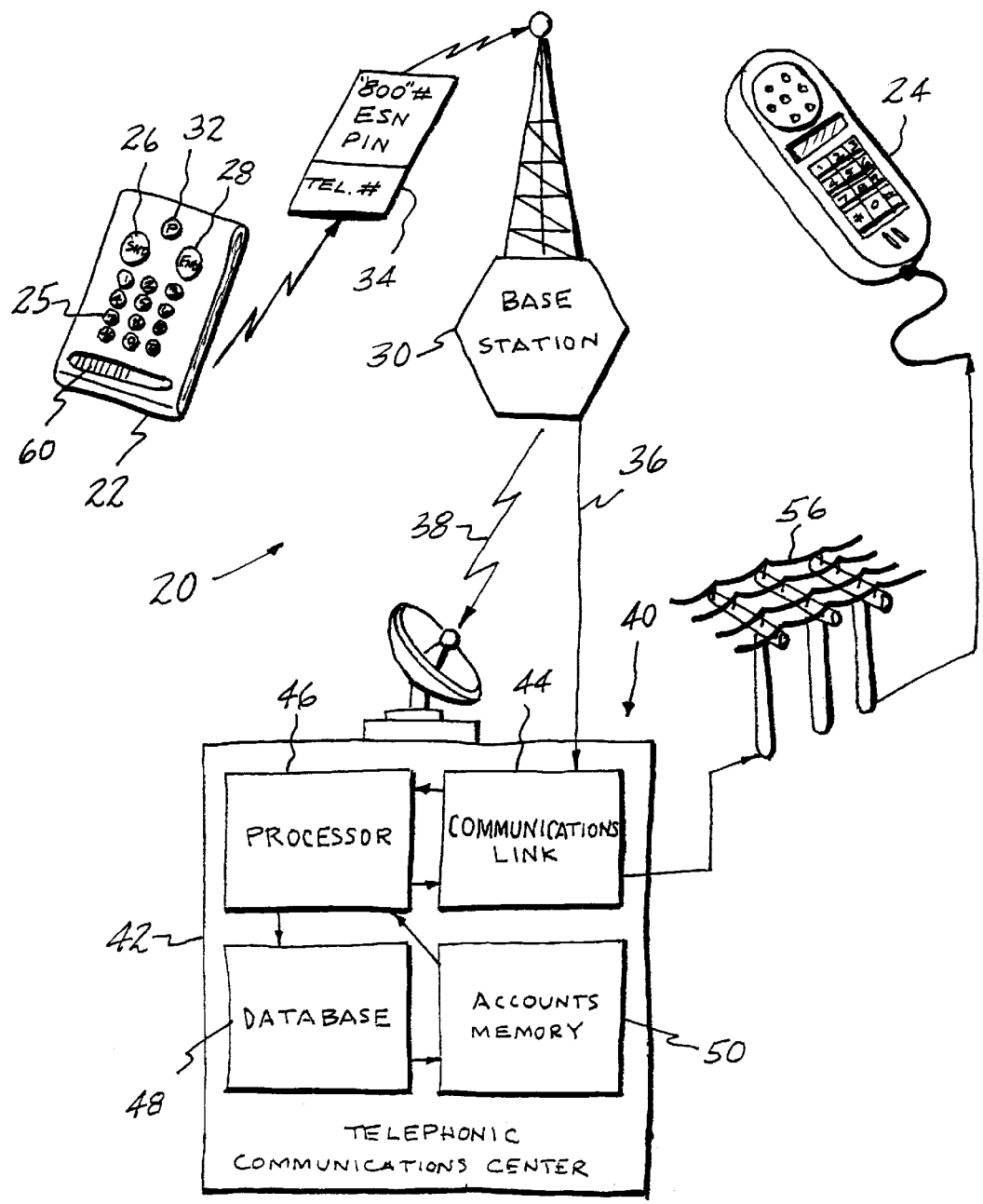
FIG. 1 is a schematic diagram illustrating a system and method of the present invention.
Figure 2:
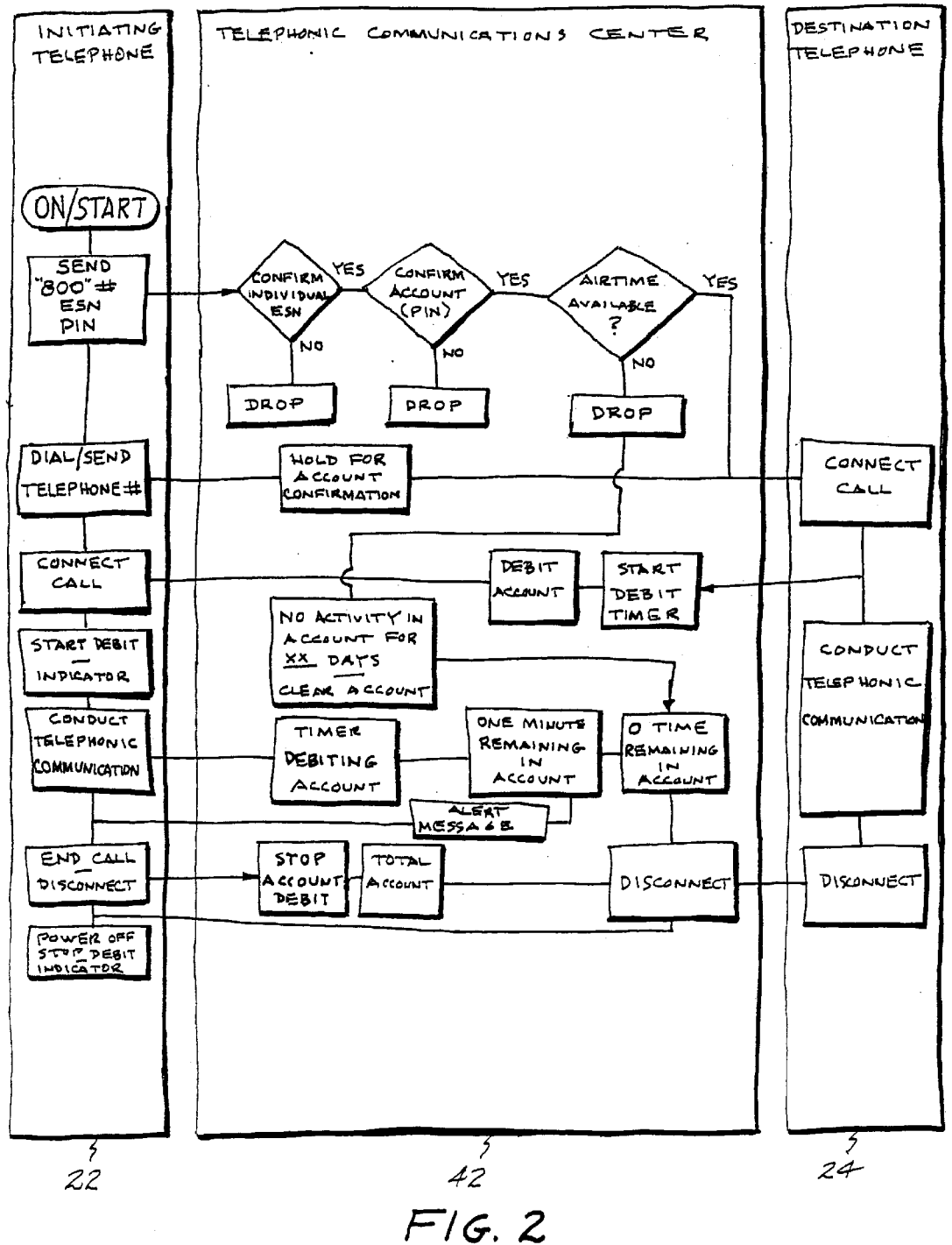
FIG. 2 is a flow chart diagram demonstrating the operation of the system and method.

Referring now to the drawing, and especially to FIGS. 1 and 2 thereof, a wireless telephonic communication system constructed in accordance with the present invention is illustrated generally at 20 and is seen in use to establish a telephonic communication between a wireless telephonic device, shown in the form of a wireless telephone 22, and a telephonic destination, shown in the form of a remote, conventional wired telephone 24. Telephone 22 is constructed as described more fully in parent applications Ser. Nos. 09/660,130 and 09/741,719, and is one of a multiplicity of like wireless telephones 22 capable of being used in system 20. Each telephone 22 includes a keypad 25, a SEND control 26 and an END control 28.

Each telephone 22 is programmed or embedded with an assigned telephone access number common to all of the telephones 22, the assigned common access number preferably being in the form of a toll-free telephone number illustrated as an "800" number. In addition, each telephone 22 includes an-individual identification number unique to the one individual telephone 22, illustrated as a personal identification number (PIN), which identifies an individual account, and an individual electronic serial number (ESN), which complies with regulatory requirements for wireless telephonic devices.

For economy, telephone 22 is constructed for call-out only and is capable of initiating a telephone call, but cannot receive a telephone call initiated by a remote telephone, as described in U.S. Pat. No. 6,061,580, the substance of which is incorporated herein by reference thereto. In the illustrated embodiment, telephone 22 is a cellular wireless telephone and is used in connection with a cellular system which includes a cellular base station 30. In order to initiate a telephone call, telephone 22 first is turned ON, as with a power-on/off switch 32. The caller then can dial the telephone number of the desired destination, using the keypad 25, and then actuates the SEND control 26; however, connection of the telephone call is not completed until eligibility is first determined. Thus, an auto-dialing protocol in the telephone 22 automatically dials the "800" number and transmits information 34 pertaining to the "800" number, along with the PIN and the ESN, to the base station 30, as a request for a telephonic communication. Information 34 then is relayed, either by landline 36 or by wireless transmission 38, to an existing telephonic infrastructure 40, which infrastructure 40 includes a telephonic communications center 42. Information 34 is received by a communications link 44 and passed to a processor 46 which, together with information stored in a database 48 and an accounts memory 50, processes the request to determine the eligibility of the one wireless telephone 22 for conduct of the requested telephonic communication.

Eligibility is determined by confirming the identity of the telephone 22 and the validity of the account represented by the PIN. In addition, since telephone 22 is supplied with a predetermined amount of airtime, either by means of an internal timing arrangement within the telephone 22 itself, or by means of time records maintained in the accounts memory 50, all as described more fully in the aforesaid previous applications and patents, eligibility includes the availability of airtime to meet the request. Should there be a failure to confirm telephone identity, account validity or the availability of airtime, the request for a telephonic communication will be denied and the call will be dropped. Upon confirmation of telephone identity, account validity and airtime availability the previously dialed telephone call is connected, through the communications link 44, to the transmission arrangement of the existing telephonic infrastructure 40 to complete the telephonic communication between the wireless telephone 22 and the selected telephonic destination represented by telephone 24. The transmission arrangement is illustrated in the form of landlines 56; however, other transmission arrangements may be employed, such as an existing cellular network, as available in a particular existing telephonic infrastructure.

Once connected, telephonic communication is carried out between telephones 22 and 24. Airtime is debited, either by debiting the account maintained at the telephonic communications center 42 or by the internal timing arrangement within the telephone 22 itself. In the preferred construction, telephone 22 is provided with a visual indicator 60 which furnishes a visible indication of the available remaining airtime. As an added feature, an audible indication is provided in the form of an alert tone to alert a caller of the availability of only a limited amount of remaining airtime, for example, one minute, before airtime is exhausted and disconnection will ensue. Upon completion of the telephonic communication, the caller will actuate the END control 28, thereby disconnecting the telephone call and turning off the power. Debiting of the account is discontinued and the account reflects the total airtime available subsequent to the completed telephone call.

Preferably, telephone 22 is time-sensitive; that is, the account represented by an individual telephone 22 is valid only for a predetermined period, for example, fifteen months. Upon expiration of the predetermined period, the account is cleared and the PIN is recycled. In this manner, the availability of PIN's is increased.

Figure 3:
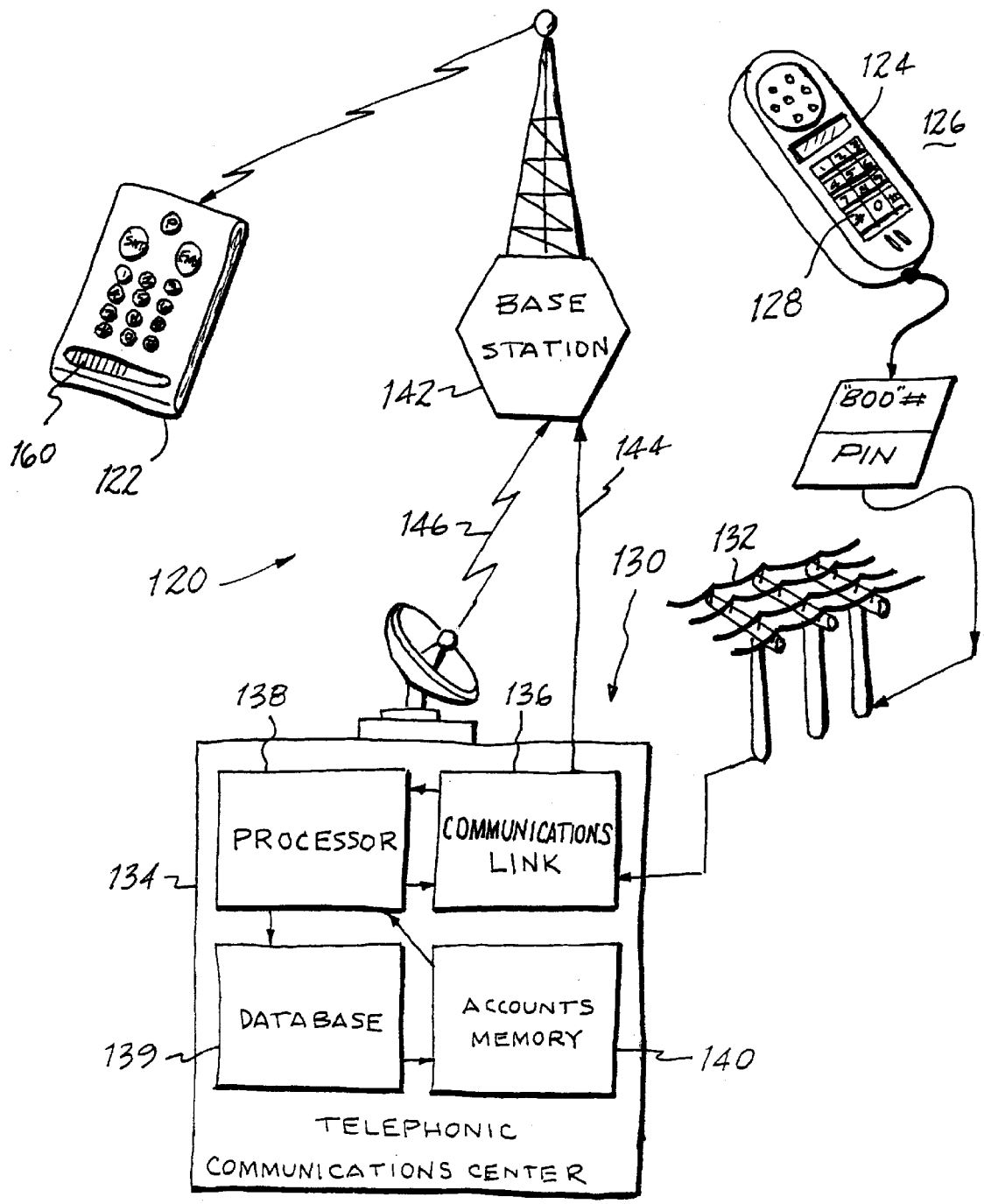
FIG. 3 is a schematic diagram illustrating another system and method of the present invention.
Figure 4:
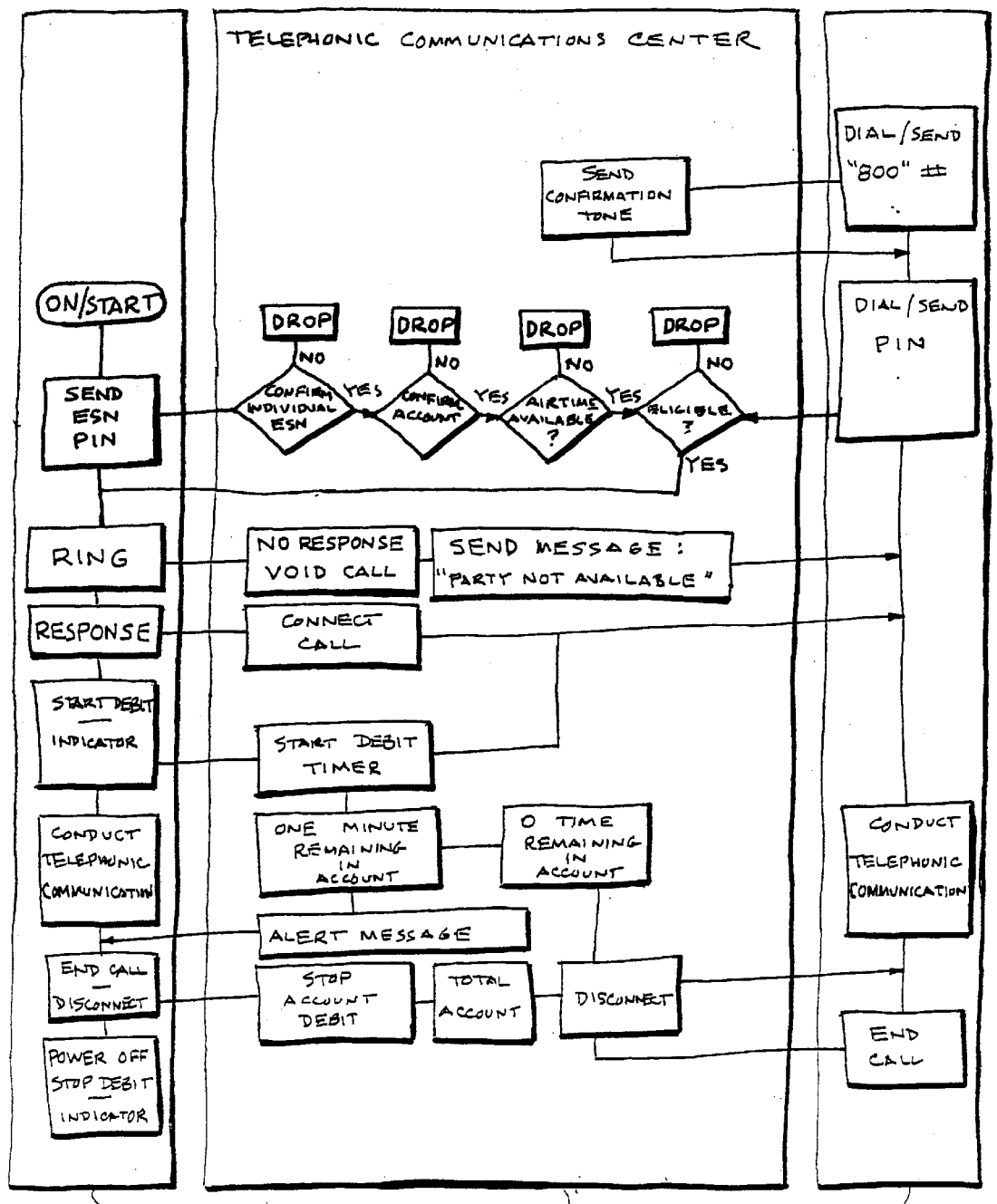
FIG. 4 is a flow chart diagram demonstrating the operation of the system and method of FIG. 3.

Turning now to FIGS. 3 and 4, wireless communication system 120 is similar to the above-described system 20, except that wireless telephonic device of system 120 is shown in the form of a call-out and call-in wireless telephone 122, capable of receiving incoming calls as well as initiating outgoing calls. Thus, telephone 122 includes telephonic circuitry which allows for the reception of incoming telephone calls, similar to the wireless telephones described in U.S. Pat. No. 5,875,393, the substance of which is incorporated herein by reference thereto. A telephone call to wireless telephone 122 from a conventional telephone 124 located at a remote site 126 is initiated by dialing a telephone access number known to the caller to be assigned to wireless telephone 122, the assigned telephone access number preferably being a toll-free number, illustrated herein as an "800" number, using the keypad 128 of the telephone 124. In response, a call is put through, via an existing telephonic infrastructure 130 which includes landlines 132, to a telephonic communications center 134 and is acknowledged with a confirmation message in the form of a confirmation tone.

Upon hearing the confirmation tone, the caller dials the PIN which the caller knows is assigned to the particular wireless telephone 122 being called. Information pertaining to the PIN dialed by the caller is received at a communication link 136 and processed, by processor 138 in conjunction with database 139 and accounts memory 140, to confirm that the account identified by the PIN is available, that is, that the account is valid, active and has available airtime. If the account is not available, the call is dropped. If the account is available, wireless telephone 122 is determined to be eligible to receive a call and the call is connected to a cellular base station 142, through either landline 144 or a wireless transmission 146, and is forwarded to wireless telephone 122. Wireless telephone 122 signals reception of an incoming call, as by a ring. If there is no response, the call is voided and a message is sent to the caller indicating that the party is off the line. If there is a response, the call is connected and a telephonic communication is commenced. At the same time, debiting of the account is commenced within the telephonic communications center 134 and, if telephone 122 is provided with an internal timing arrangement within the telephone 122 itself, airtime is debited within the telephone 122. As before, remaining available airtime is displayed at a visual display 160 provided in telephone 122. Upon completion of the call, debiting of the airtime is discontinued, and the call is ended and disconnected. As before, available airtime is monitored and an alert message is transmitted to warn of the impending exhaustion of available airtime.

Figure 5:
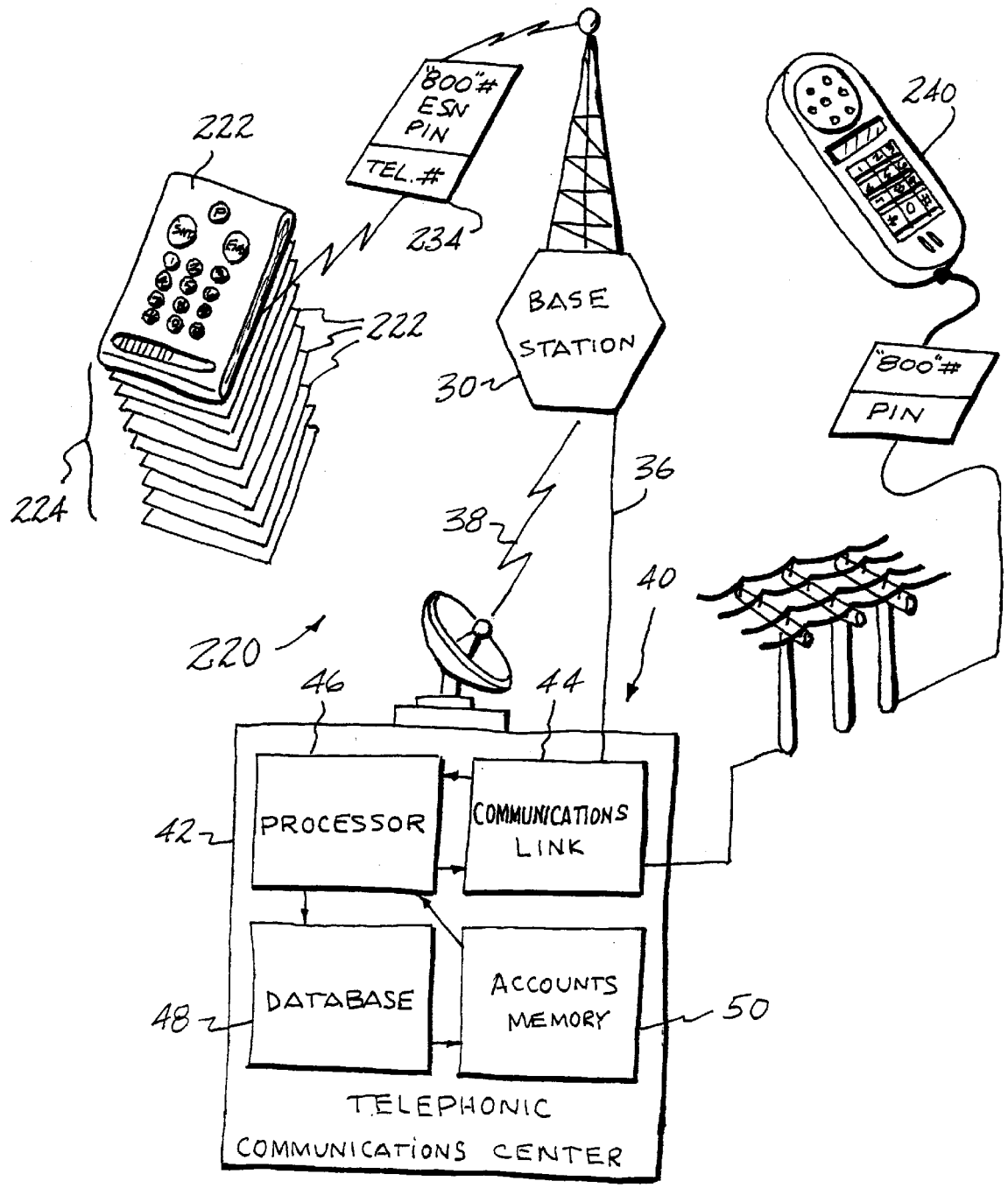
FIG. 5 is a schematic diagram illustrating still another system and method of the present invention.
Figure 6:
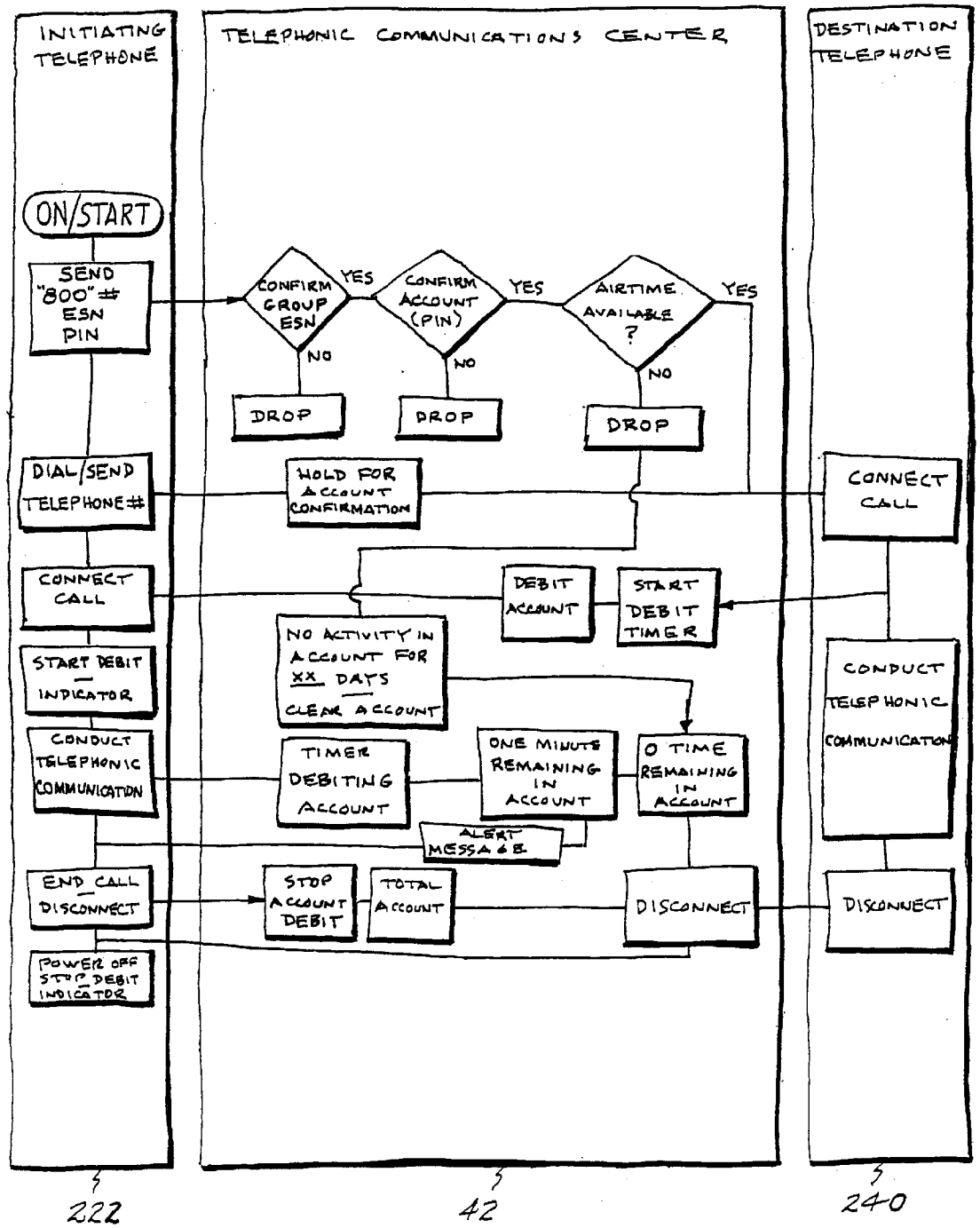
FIG. 6 is a flow chart diagram demonstrating one operation of the system and method of FIG. 5.
Figure 7:
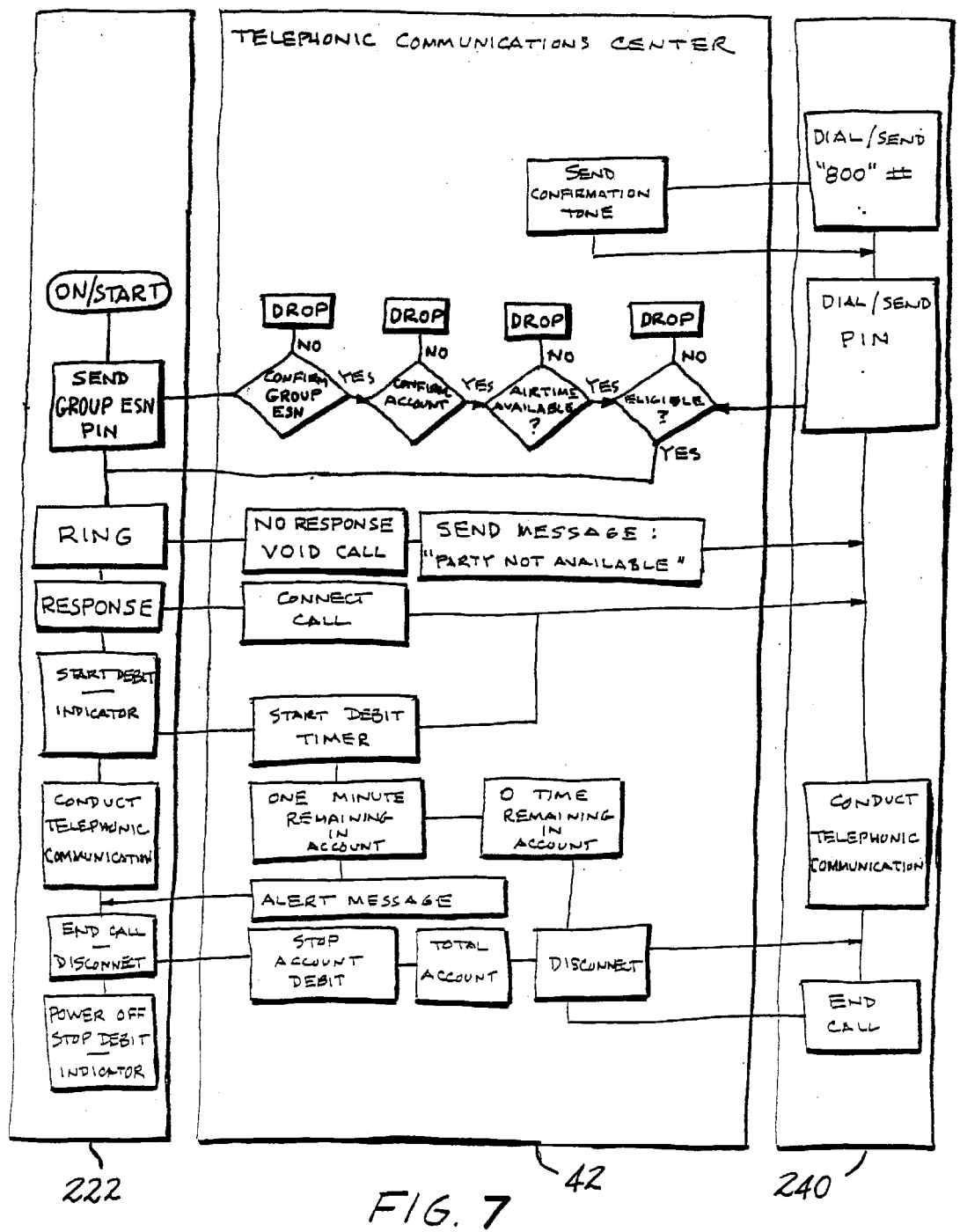
FIG. 7 is a flow chart diagram demonstrating another operation of the system and method of FIG. 5.

In FIGS. 5 through 7, wireless telephonic communication system 220, constructed in accordance with the present invention, includes a multiplicity of wireless telephonic devices shown in the form of wireless telephones 222, the multiplicity being grouped in a group 224 of as many as one million wireless telephones 222. Much of system 220 includes the same components as system 22 and like components are labelled with like reference characters. In the illustrated embodiment, wireless telephones 222 are capable of call-out, as described in connection with the embodiment of FIGS. 1 and 2, and call-in, as described in connection with the embodiment of FIGS. 3 and 4. In order to conserve the number of ESN's placed into service, all of the telephones 222 of the group 224 are assigned a common ESN, illustrated as a group ESN, and the group ESN is embedded, or programmed, into each telephone 222, along with a telephone access number common to all of the telephones 222, preferably in the form of a toll-free, "800" number, and an individual identification number unique to that one telephone 222, preferably in the form of a PIN.

As described above in connection with telephone 22, upon initiating a telephone call from any one of telephones 222, an auto-dialing protocol in the telephone 222 automatically dials the "800" number and transmits information 234 pertaining to the "800" number, along with the PIN and the group ESN, to base station 30, as a request for a telephonic communication. Information 234 then is relayed, either by landline 36 or by wireless transmission 38, to an existing telephonic infrastructure 40, which infrastructure 40 includes a telephonic communications center 42. Processor 46 receives information 234, through communications link 44, and, together with information stored in database 48 and accounts memory 50, processes the request to determine the eligibility of the one wireless telephone 222 for conduct of the requested telephonic communication. However, in this instance, eligibility is determined by utilizing the group ESN, as well as the account PIN, to confirm the identity of the telephone 222 and the availability of the account. Once eligibility is determined, system 220 operates in the manner described above, in connection with system 20, to complete the connection and conduct of a telephonic communication with remote telephone 240.

Telephone 222 receives incoming calls in a manner similar to that described above in connection with telephone 122, with the eligibility of telephone 222 determined through the use of the group ESN, as well as the account PIN, to confirm the identity of telephone 222 and the availability of the corresponding account.

Figure 8:
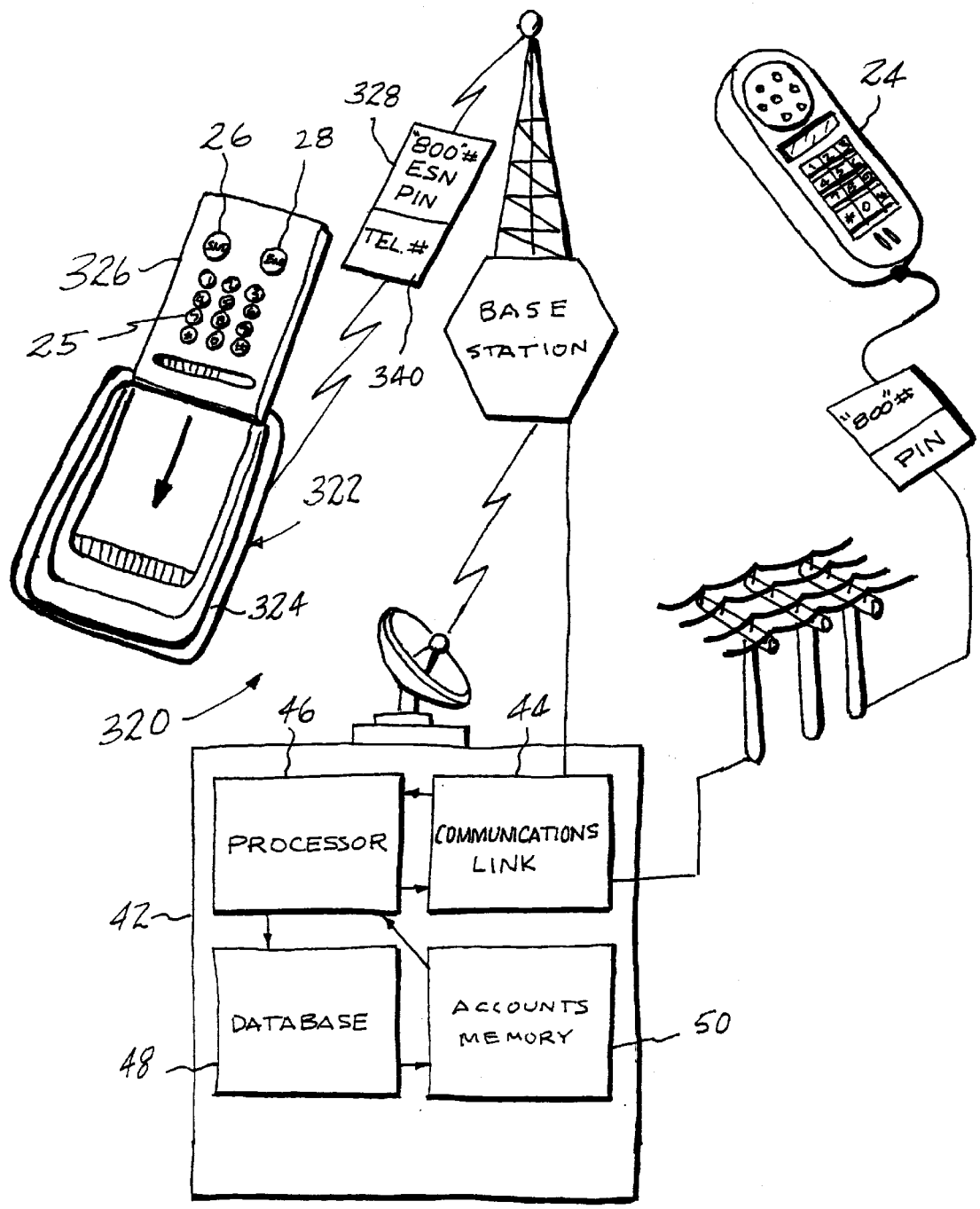
FIG. 8 is a schematic diagram illustrating yet another system and method of the present invention.

Turning now to FIG. 8, wireless telephonic communication system 320 is similar to systems 20, 120 and 220, and like elements of the systems are identified with the same reference characters. In system 320, however, the multiplicity of wireless telephonic devices is illustrated in the form a wireless telephone 322 having a compact modular construction similar to the compact modular construction described in application Ser. No. 09/741,719. Thus, wireless telephone 322 includes a base unit 324 and an enabling module 326. The module 326 includes an internal timing mechanism and a keypad 25, as well as the SEND and END controls 26 and 28, and is programmed with the assigned common telephone access number in the form of an "800" number and an individual PIN. The base unit 324 includes telephonic circuitry and a power supply, and is programmed with an ESN. Accordingly, the base unit 324 provides the constant requirements for a complete telephonic device, i.e., telephonic circuitry, power and an ESN, while the enabling module 326 provides variable requirements, i.e., the "800" access number, the PIN and the keypad 25.

Once the enabling module 326 is coupled with the base unit 324, a telephone call can be initiated or received, in the manner described above. The base unit 324 sends information 328 pertaining to the ESN programmed into the base unit 324, along with the "800" access number and the PIN programmed into the enabling module 326 and automatically dialed by the enabling module 326. The caller dials the desired destination, as identified by telephone number 340, using the keypad 25 to request a telephonic communication. The processor 46 then works in concert with the database 48 and the accounts memory 50, at the telephonic communications center 42, to recognize and confirm the validity of the account, determine if there is available airtime in the account, and then complete connection of the requested telephonic communication to remote telephone 24. The account then is debited, either at the telephonic communications center 42 or within the enabling module 326 of the telephone 322 itself, with the airtime used during conduct of the telephonic communication.

Figure 9:
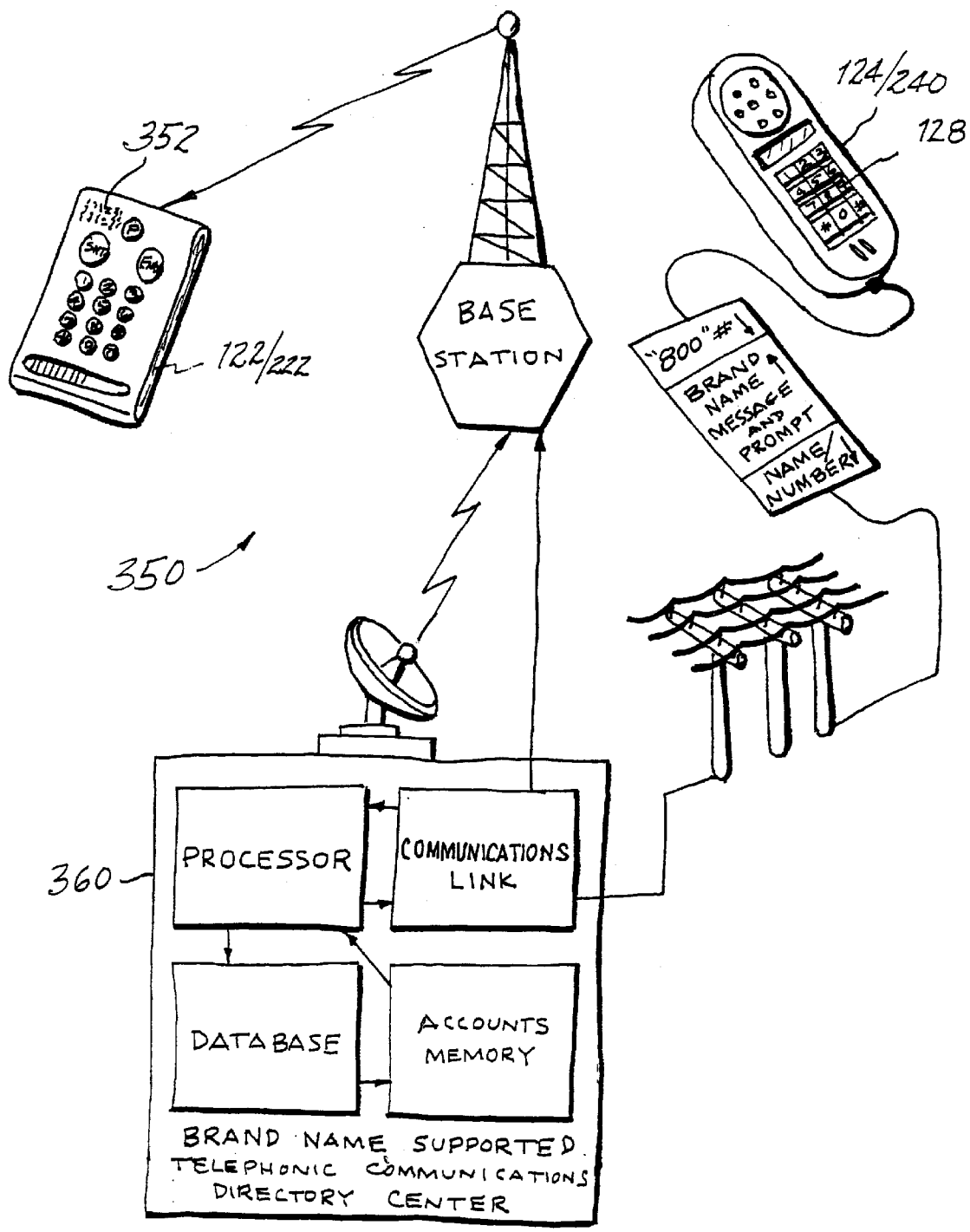
FIG. 9 is a schematic diagram illustrating another system and method of the present invention.
Figure 10:
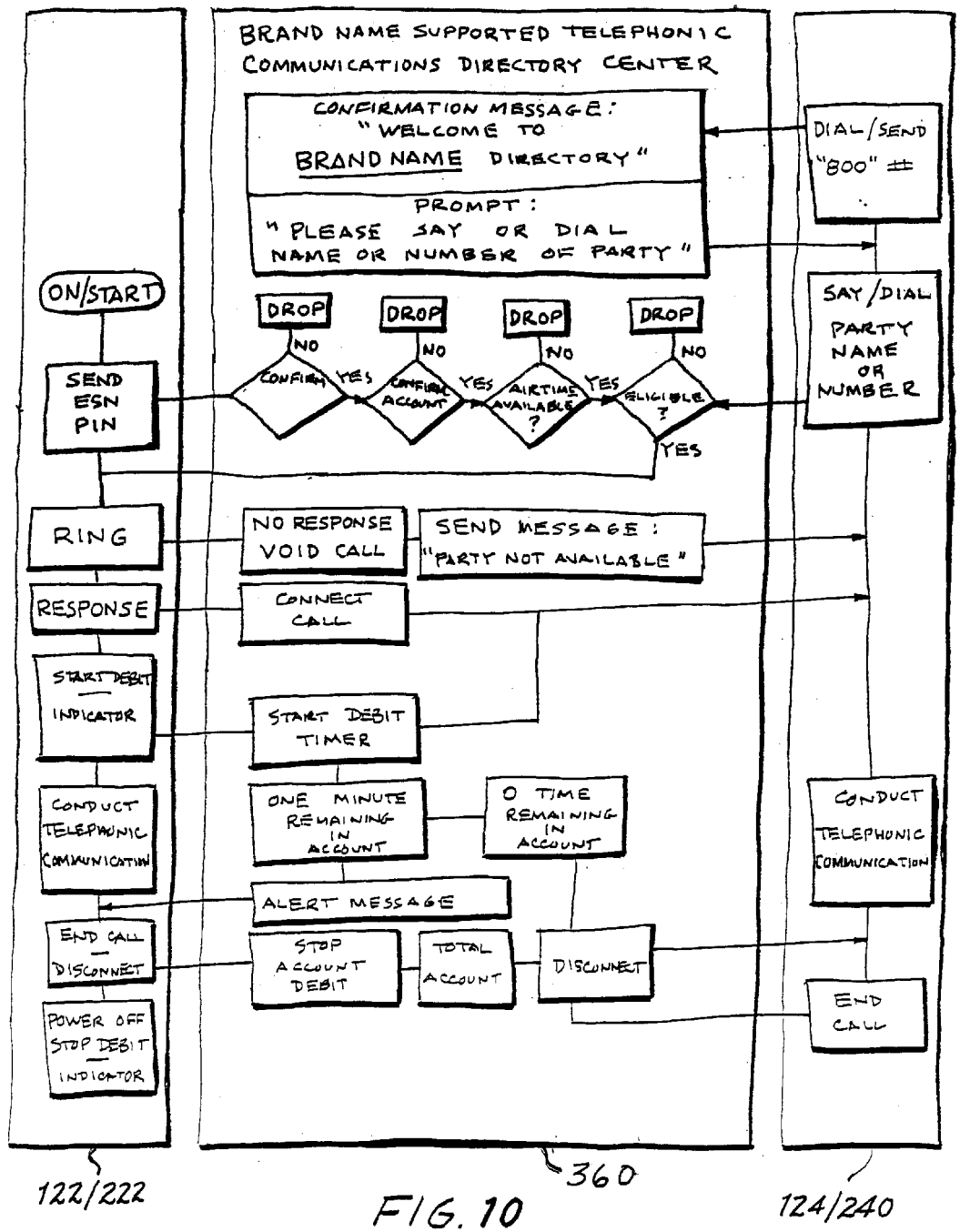
FIG. 10 is a flow chart diagram demonstrating a feature of the system and method of FIG. 9.

Turning now to FIGS. 9 and 10, the wireless telephonic communication systems described above lend themselves to advantageous promotional arrangements. In particular, as depicted in FIG. 9, either of the systems 120 and 220 can be the basis for system 350 arranged to offer the purchaser of a telephonic device such as telephone 122 or 222 the option of becoming aligned with a particular brand name to be promoted. Incentives are provided to align with a brand name, the incentives including such items as rate preferences, coupon offers, promotional products and services, and the like. The brand name can appear at 352 on the telephone 122/222; however, more importantly, the brand name is promoted when the purchaser is called from a remote telephone 124/240.

As seen in FIG. 10, as well as in FIG. 9, when a caller wishes to call the purchaser on the purchaser's telephone 122/222, the caller dials the purchaser's "800" number, using keypad 128 of telephone 124/240, and is connected with a brand name supported telephonic communications directory center 360. The caller then receives a confirmation message which includes information pertaining to the brand name, at least identifying the brand name, and a prompt advising the caller to enter the name of the party being called, or the number (PIN) of the party, either by voice or by a keypad 128 entry. The call request then is processed as described above, in connection with systems 120 and 220. In this manner, the brand name is promoted to the caller.

Figure 11:
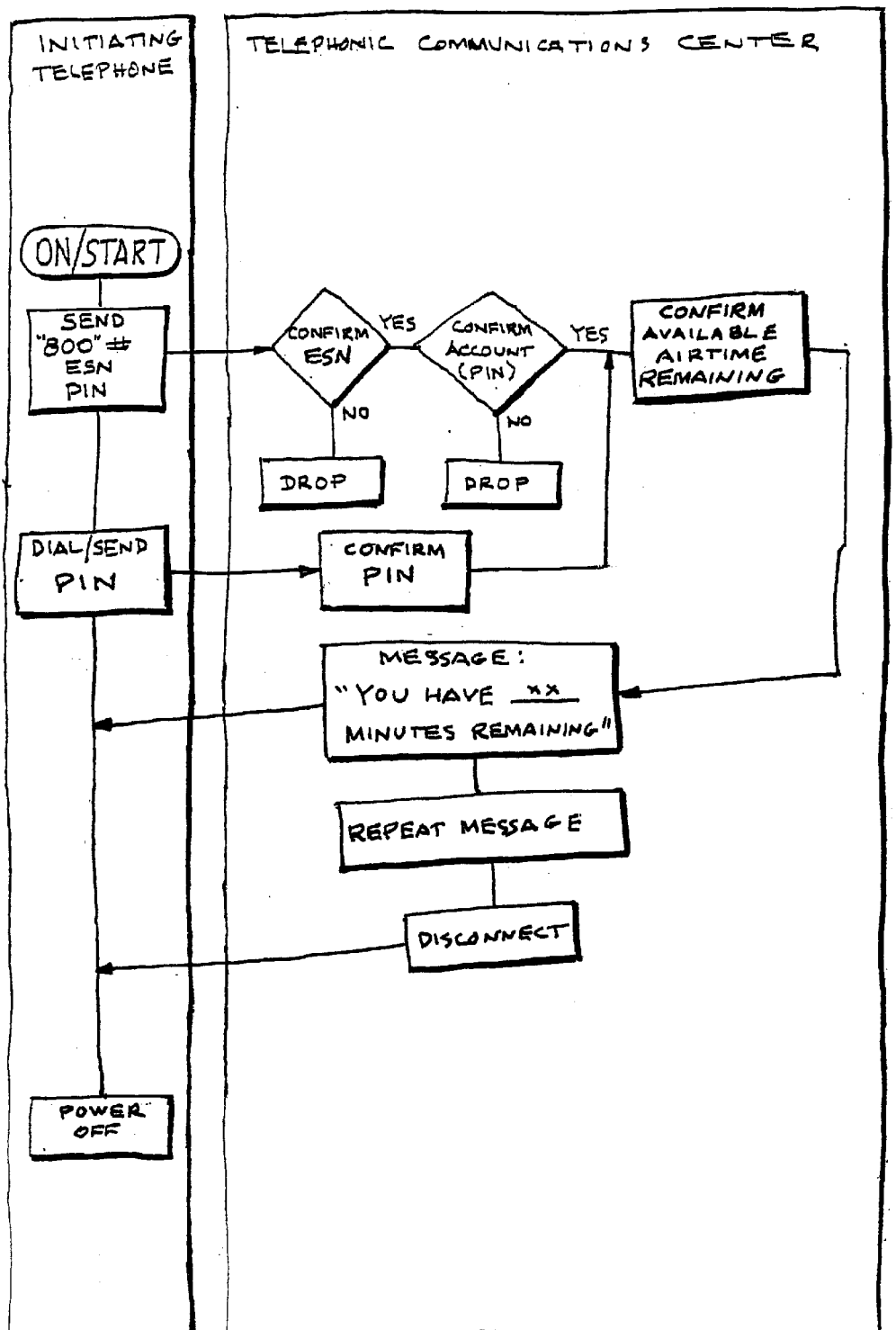
FIG. 11 is a flow chart diagram demonstrating an optional feature.

Referring now to FIG. 11, an account owner can access the account at anytime to determine how much airtime remains in the account at that time in any of the wireless telephonic communication systems described above. For example, in system 20, subsequent to turning telephone 22 ON, the caller, rather than dialing the remote telephone 24, dials and sends the PIN. The information is processed at the telephonic communications center 42 where the available airtime remaining is confirmed and information in the form of a message advising of the remaining available airtime is returned to the telephone 22. The message is repeated for convenience and, after the message is sent twice, the call is disconnected.

It will be seen that the present invention attains all of the objects and advantages summarized above, namely: Allows current telephonic communication infrastructures to accommodate telephonic communication through ever-increasing numbers of wireless telephonic devices without the necessity for assigning an individual telephone number or an individual electronic serial number to each wireless telephonic device; facilitates telephonic communication through a very large number of wireless telephonic devices, utilizing currently available telephonic communication infrastructures in order to accommodate the proliferation of wireless telephonic communication devices; enables the use of current telephonic communication infrastructures to handle the burgeoning requirements for telephonic communication through wireless telephonic devices; opens new opportunities for promoting brand name recognition through the use of wireless telephonic devices; enhances the management of wireless telephonic communication for more effective use of currently available airtime and facilities; simplifies the acquisition and use of wireless telephonic devices for encouraging more widespread wireless communication and providing the benefits of such communication to an expanding community.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A wireless telephonic communication system for facilitating the establishment of telephonic communication with any one of a multiplicity of wireless telephonic devices by enabling access to an existing telephonic communication infrastructure by any one of the multiplicity of wireless telephonic devices for the conduct of telephonic communication over the existing telephonic communication infrastructure without requiring a corresponding multiplicity of telephone access numbers, the system comprising:

a multiplicity of wireless telephonic devices, each one of the wireless telephonic devices having an assigned telephone access number common to all of the multiplicity of wireless telephonic devices, and an individual identification number unique to the one wireless telephonic device; and a telephonic communication center selectively accessed by any one of the multiplicity of wireless telephonic devices in response to the assigned common telephone access number for receiving a request for a telephonic communication from the one wireless telephonic device to a selected telephonic destination;

the telephonic communication center including a processor for processing the request to determine the eligibility of the one wireless telephonic device for conduct of the requested telephonic communication, in accordance with the individual identification number, and, upon determining that the one wireless telephonic device is eligible for conduct of the requested telephonic communication, establishing a connection to the existing telephonic communication infrastructure for completing a telephonic communication between the one wireless telephonic device and the selected telephonic destination; and the individual identification number including an electronic serial number.

2. The invention of claim 1 wherein the electronic serial number is common to all of the multiple wireless telephonic devices.

3. The invention of claim 2 wherein the individual identification number includes a personal identification number unique to each one of the multiple wireless telephonic devices.

4. The invention of claim 1 wherein the wireless telephonic devices each include:

a base unit including telephonic circuitry and programmed with an electronic serial number common to all of the multiple wireless telephonic devices; and an enabling module including a keypad and programmed with the assigned telephone access number common to all of the multiplicity of wireless telephonic devices, and the individual identification number unique to the one wireless telephonic device.

5. The invention of claim 1 wherein the telephonic communication center is selectively accessed by a remote telephonic device in response to the assigned common telephone access number for receiving a request for a telephonic communication with one of the multiple wireless telephonic devices from the remote telephonic device, and completes a telephonic communication between the remote telephonic device and the one of the multiple wireless telephonic devices in response to the individual identification number of the one of the multiple wireless telephonic devices upon a determination by the processor of the eligibility of the one of the multiple wireless telephonic devices to conduct the requested telephonic communication.

6. The invention of claim 5 wherein the one of the multiple wireless telephonic devices is aligned with a brand name and, upon access to the telephonic communication center by the remote telephonic device, information pertaining to the brand name alignment is transmitted to the remote telephonic device.

7. A wireless telephonic communication method for facilitating the establishment of telephonic communication with any one of a multiplicity of wireless telephonic devices by enabling access to an existing telephonic communication infrastructure by any one of the multiplicity of wireless telephonic devices for the conduct of telephonic communication over the existing telephonic communication infrastructure without requiring a corresponding multiplicity of telephone access numbers, the method comprising:

providing each one of a multiplicity of wireless telephonic devices with an assigned telephone access number common to all of the multiplicity of wireless telephonic devices, and an individual identification number unique to each one wireless telephonic device;

selectively accessing a telephonic communication center from any one of the multiplicity of wireless telephonic devices in response to the assigned common telephone access number for initiating a request for a telephonic communication from the one wireless telephonic device to a selected telephonic destination; and processing the request to determine the eligibility of the one wireless telephonic device for conduct of the requested telephonic communication, in accordance with to the individual identification number and, upon determining that the one wireless telephonic device is eligible for conduct of the requested telephonic communication, establishing a connection to the existing telephonic communication infrastructure for completing a telephonic communication between the one wireless telephonic device and the selected telephonic destination;

the individual identification number including an electronic serial number.

8. The invention of claim 7 wherein the electronic serial number is common to all of the multiple wireless telephonic devices.

9. The invention of claim 8 wherein the individual identification number includes a personal identification number unique to each one of the multiple wireless telephonic devices.

10. The invention of claim 7 wherein selective access to the telephonic communication center is by a remote telephonic device in response to the assigned common telephone access number for initiating a request for a telephonic communication with one of the multiple wireless telephonic devices from the remote telephonic device, and completion of a telephonic communication is between the remote telephonic device and the one of the multiple wireless telephonic devices in response to the individual identification number of the one of the multiple wireless telephonic devices upon a determination of the eligibility of the one of the multiple wireless telephonic devices to conduct the requested telephonic communication.

11. The invention of claim 10 including aligning the one of the multiple wireless telephonic device with a brand name and, upon access to the telephonic communication center by the remote telephonic device, transmitting to the remote telephonic device information pertaining to the brand name alignment.

\* \* \* \* \*